US010207455B2

United States Patent
Kan et al.

(10) Patent No.: US 10,207,455 B2
(45) Date of Patent: Feb. 19, 2019

(54) FLEXIBLE PIPE WITH CORROSION RESISTANT LAYER

(71) Applicants: Wan C. Kan, Houston, TX (US); Krassimir I. Doynov, Houston, TX (US); Venkat R. Krishnan, Houston, TX (US)

(72) Inventors: Wan C. Kan, Houston, TX (US); Krassimir I. Doynov, Houston, TX (US); Venkat R. Krishnan, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 345 days.

(21) Appl. No.: 14/836,293

(22) Filed: Aug. 26, 2015

(65) Prior Publication Data

US 2016/0076675 A1 Mar. 17, 2016

Related U.S. Application Data (60) Provisional application No. 62/051,627, filed on Sep. 17, 2014, provisional application No. 62/196,738, filed on Jul. 24, 2015.

(51) Int. Cl.
*B29C 65/00* (2006.01)
*F16L 58/00* (2006.01)
(Continued)

(52) U.S. Cl.
CPC .............. *B29C 65/002* (2013.01); *B32B 1/08* (2013.01); *B32B 15/02* (2013.01); *B32B 15/08* (2013.01);
(Continued)

(58) Field of Classification Search
CPC .................................................... B29C 65/002
(Continued)

(56) References Cited

U.S. PATENT DOCUMENTS 6,338,365 B1 * 1/2002 Odru ..................... F16L 11/082
138/131
6,648,023 B2 * 11/2003 Nakakita ............... F16L 11/088
138/125
(Continued)

FOREIGN PATENT DOCUMENTS

| FR | 2 583 133 | 12/1986 |
| WO | WO 2006/097112 | 9/2006 |
| WO | WO 2008/116469 | 10/2008 |
| WO | WO 2013/188812 | 12/2013 |
| WO | WO 2016/034181 | 3/2016 |

OTHER PUBLICATIONS

Technip, "The Anti-H$_2$S Layer," Tomorrow, A Technip Technology Publication, Aug. 2012, pp. 4-5, Issue 1, Paris, France. Retrieved Jul. 16, 2015, from http://www.technip.com/sites/default/files/technip/fields/tomorrow/tomorrow-magazine.pdf.

(Continued)

*Primary Examiner* — Craig Schneider
*Assistant Examiner* — David Deal
(74) *Attorney, Agent, or Firm* — ExxonMobil Upstream Research Company—Law Department (57) ABSTRACT

The present techniques are directed to a flexible pipe. An inner carcass layer forms the innermost layer of the flexible pipe. An inner sheath layer and an outer sheath layer are disposed externally of the inner carcass layer. A layer of corrosion resistant alloy is disposed at any location between the inner carcass layer and the outer sheath layer. At least one armor layer is disposed internally of the outer sheath layer.

14 Claims, 8 Drawing Sheets

(51) Int. Cl.
*F16L 11/08* (2006.01)
*B32B 15/02* (2006.01)
*B32B 15/08* (2006.01)
*B32B 15/18* (2006.01)
*B32B 27/30* (2006.01)
*B32B 27/32* (2006.01)
*B32B 27/34* (2006.01)
*B32B 1/08* (2006.01)
*B29D 23/00* (2006.01)

(52) U.S. Cl.
CPC ............ *B32B 15/18* (2013.01); *B32B 27/304* (2013.01); *B32B 27/32* (2013.01); *B32B 27/34* (2013.01); *F16L 11/083* (2013.01); *F16L 58/00* (2013.01); *B29D 23/00* (2013.01); *B29D 23/001* (2013.01); *B32B 2307/554* (2013.01); *B32B 2307/714* (2013.01); *B32B 2597/00* (2013.01)

(58) Field of Classification Search
USPC ................ 138/135, 134, 129, 138, 137, 140
See application file for complete search history.

(56) References Cited

U.S. PATENT DOCUMENTS

| | | | |
|---|---|---|---|
| 6,904,939 | B2 | 6/2005 | Jung et al. |
| 8,082,954 | B2 | 12/2011 | Rytter |
| 8,366,351 | B2 | 2/2013 | Rocher |
| 2005/0067034 | A1* | 3/2005 | Thomson .............. F16L 11/082 138/135 |
| 2011/0162750 | A1 | 7/2011 | Marchand |
| 2012/0266997 | A1 | 10/2012 | Thygesen et al. |
| 2013/0032240 | A1 | 2/2013 | Kuhmann et al. |
| 2013/0112308 | A1 | 5/2013 | Glejbøl |

OTHER PUBLICATIONS

Beckman, J., "Anti-H2S layer extends operating envelope for sour service flexible," Offshore Magazine, Sep. 2012, vol. 72 Issue 9. Retrieved Jul. 16, 2015, from http://www.offshore-mag.com/articles/print/volume-72/issue-9/flowlines-and-pipelines/anti-h2s-layer-extends-operating-envelope-for-sour-service-flexible.html.

* cited by examiner

FLEXIBLE PIPE WITH CORROSION RESISTANT LAYER

CROSS-REFERENCE TO RELATED APPLICATION

This application claims the priority benefit of U.S. Provisional Patent Application No. 62/051,627, filed Sep. 17, 2014, and U.S. Provisional Patent Application No. 62/196,738, filed Jul. 24, 2015, both entitled FLEXIBLE PIPE WITH CORROSION RESISTANT LAYER, the entireties of which are incorporated by reference herein.

FIELD

The present disclosure relates generally to a corrosion resistant alloy layer within a flexible pipe. More particularly, the present techniques relate to disposing a layer of corrosion resistant alloy (CRA) within a flexible pipe to inhibit the diffusion of corrosive materials and water from internal or external sources into an annular region of the flexible pipe.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Since the 1970s, flexible pipes have been utilized in the hydrocarbon industry as flow lines, risers, and jumpers, among others, to transport raw materials, production fluids, and other materials associated with offshore oil and gas production. Overall, the enhanced flexibility and versatility of a flexible pipe lends to a more economical design solution for transporting offshore oil and gas. In particular, the flexible pipe has an advantage over a rigid pipe of the same diameter due to its relatively low ratio of bending to axial stiffness.

The structure of the flexible pipe typically includes a number of layers of different materials in the pipe wall fabrication. One such layer may include a metal layer, or an inner carcass, that is permeable to production fluids and is in direct contact with such fluids. The function of the inner carcass is to prevent the collapse of the flexible pipe as a result of gas expansion or hydrostatic pressure of sea water. Another layer of the flexible pipe may include a polymer sheath that can be used as an inner sheath layer and an outer sheath layer. The inner sheath layer may be implemented to maintain the integrity of the production fluids. Thus, the type of materials selected for the inner sheath layer may be based on various parameters, such as the inner production fluid temperature, composition, and pressure. The outer sheath layer may be implemented to provide a barrier against factors external to the flexible pipe, including seawater diffusion and mechanical damage.

The flexible pipe may include an annular region located between the inner sheath layer and the outer sheath layer. The annular region may comprise armor layers that can include one or more pressure armor layers and tensile armor layers. Accordingly, pressure armor layers may be implemented to withstand internal pressure exerted by the inner production fluids. Tensile armor layers may be implemented to resist the tensile load on the flexible pipe. For example, the tensile armor layers may be utilized to support the weight of the flexible pipe as it extends from a side of a vessel and to transfer the load of the flexible pipe to the vessel and into a seabed.

The armor layers within the annular region may typically include a high strength material. Yet, the possibility for the diffusion of acid gases from the production fluids through a breached inner sheath layer may create a corrosive environment within the annular region, e.g., initiating corrosion or other degradation of the armor layers within the annular region. Further, there is a possibility that condensation or accidental damages to the outer sheath layer may result in the infiltration of water into the annular region, thus, leading to corrosion or other degradation of the armor layers. The resulting corrosion or other degradation of the armor layers in the annular region may affect production operations, which may shorten the lifespan of the flexible pipe and interfere in production operations, among other effects.

As one particular example, cathodic protection may be used to inhibit corrosion in the annular region. However, cathodic protection may be ineffective in preventing corrosion of the armor layers over the expected lifespan of the flexible pipe. Additionally, the use of traditional corrosion inhibitors may present challenges. For example, it may be difficult to supply a corrosion inhibitor to the annular region to protect the armor layers from corrosion or other degradation. Moreover, such corrosion inhibitors may accelerate the aging of the sheath layers, for example, by degrading the plastic that may make up the sheath layers.

U.S. Patent Application Publication No. 2013/0032240 A1 by Kuhmann, et al., describes a flexible pipe with a multilayer structure and unbonded layers. The flexible pipe has an interior lining that includes several layers. One of the layers may include materials selected from a group including polyolefin-molding composition, polyamide molding composition, and polyvinylidene fluoride molding composition. Another layer may include at least one layer of material that is composed of a molding composition based on a polymer selected from a group including polyarylene ether ketone, polyphenylene sulphide, polyarylene ether ketone/polyphenylene sulphide blend, polyphenyl sulphone, and polyalkylene naphthalate. The exterior reinforcement of the flexible pipe may provide protection from corrosion due to its constituents, which diffuse outwards from the fluid conveyed.

International Patent Application Publication No. WO 2012/006998 A1 by Glejbøl describes an unbonded flexible pipe with a length and a center axis along its length. The unbonded flexible pipe includes an internal sealing sheath surrounding the center axis and at least two tensile armor layers comprising cross wound elements surrounding the internal sealing sheath. The two tensile armor layers include a first tensile armoring layer including a plurality of first helically wound, elongate armoring elements and a second tensile armoring layer including a plurality of second helically wound, elongate armoring elements. The first helically wound, elongate armoring elements include a first material or a first combination of materials and the second helically wound, elongate armoring elements include a second material or a second combination of materials, where the first material or the first combination of materials is different from the second material or the second combination of materials. The unbonded flexible pipe further comprises a galvanic barrier between the first and the second tensile armoring layers. The galvanic barrier may consist of a peroxide containing polyolefin.

The aforementioned devices and techniques may facilitate the use of a flexible pipe in some applications. However, flexible pipes are often avoided for production fluids with a high acid gas content, e.g., greater than about 5% total content. Thus, there remains an ongoing need for more efficient techniques to inhibit or eliminate corrosion and other degradation of armor layers within the flexible pipe.

SUMMARY

An exemplary embodiment described herein provides a flexible pipe. The flexible pipe includes an inner carcass layer, an inner sheath layer, and an outer sheath layer. The inner and outer sheath layers are disposed externally of the inner carcass layer and include a polymer material. The flexible pipe includes a layer of corrosion resistant alloy, wherein the layer is disposed at any location between the inner carcass layer and the outer sheath layer. The flexible pipe also includes at least one armor layer disposed internally of the outer sheath layer.

Another exemplary embodiment provides a method of making a flexible pipe. The method includes providing an inner carcass layer, which forms an innermost interlocking layer. The method includes positioning inner and outer sheath layers externally of the inner carcass layer. The method includes positioning a layer of corrosion resistant alloy at any location between the inner carcass layer and the outer sheath layer. The method also includes positioning at least one armor layer internally of the outer sheath layer.

Another exemplary embodiment provides a flexible pipe for use during subsea production. The flexible pipe for use during subsea production includes an inner carcass layer, where production fluids flow interior of the inner carcass layer. The flexible pipe for use during subsea production includes inner and outer sheath layers disposed externally of the inner carcass layer, where the sheath layers include a polymer material. The flexible pipe for use during subsea production includes a layer of corrosion resistant alloy disposed at any location between the inner carcass layer and the outer sheath layer. The flexible pipe for use during subsea production also includes at least one armor layer disposed internally of the outer sheath layer.

DESCRIPTION OF THE DRAWINGS

The advantages of the present techniques are better understood by referring to the following detailed description and the attached drawings, in which.

DETAILED DESCRIPTION

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

Flexible pipes may be used in offshore production facilities to transport fluids of various pressure and temperature ranges while exhibiting a flexible nature during the undertaking of variable currents and wave actions. The primary layers of a flexible pipe may include an inner carcass layer, an inner sheath layer, at least one armor layer, and an outer polymer sheath. An annular region, containing the at least one armor layer, may be located between the inner sheath layer and the outer sheath layer.

During offshore production, acid gases in the production fluids, including carbon dioxide ($CO_2$) and hydrogen sulfide ($H_2S$), may diffuse through the inner sheath layer and into the annular region. Further, water vapor may breach the inner sheath layer and diffuse into the annular region. Moreover, if the outer sheath layer is breached, seawater may directly enter the annular region. The water in combination with the $CO_2$ and/or $H_2S$ and/or oxygen ($O_2$) may create a corrosive environment within the annular region. Consequentially, the at least one armor layer within the annular region may be susceptible to corrosion or other potential degradation.

In embodiments described herein, a layer of a corrosion resistant alloy may be disposed at any location between the inner carcass layer and the outer sheath layer. For example, a layer of corrosion resistant alloy may be disposed internally or externally of the inner sheath layer or internally or externally of the at least one armor layer to diffuse corrosive fluids, seawater, or both from entering the annular region in an effort to inhibit (slow down or prevent) corrosion or other degradation within the annular region.

In embodiments described herein, the annular region may include at least one pressure armor layer and/or at least one tensile armor layer. The pressure armor layers and the tensile armor layers may comprise the same material or different materials. The armor layers may comprise metal armor wires, carbon fiber wires or any other suitable armor material capable of performing as a pressure armor layer or a tensile armor layer. The metal armor wires may comprise high strength carbon steel.

Figure 1:
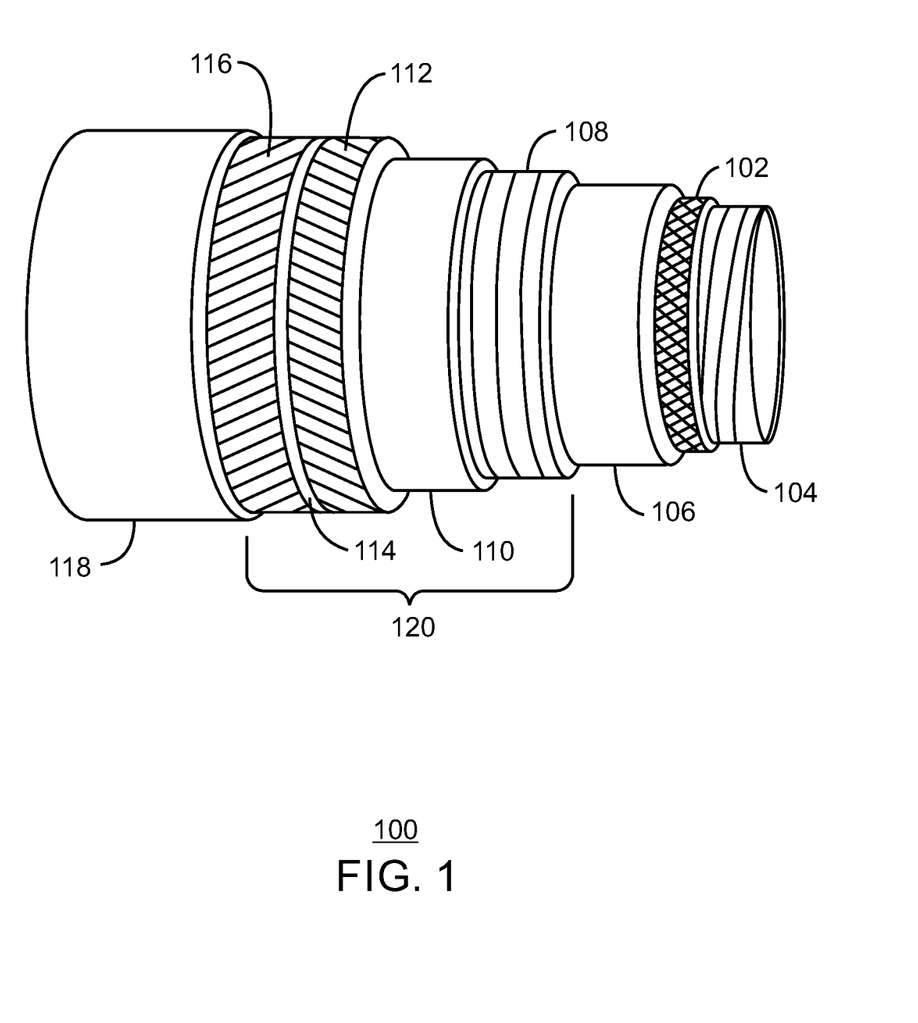
FIG. 1 is a cut-away drawing of a flexible pipe with a layer of corrosion resistant alloy disposed externally of an inner carcass layer and internally of an inner sheath layer, in accordance with one or more embodiments of the present disclosure.

FIG. 1 is a cut-away drawing of a flexible pipe with a layer of corrosion resistant alloy disposed externally of an inner carcass layer and internally of an inner sheath layer, in accordance with one or more embodiments of the present disclosure. The flexible pipe 100 includes concentric layers of materials, where each layer has a specific function. As shown in FIG. 1, the flexible pipe 100 includes the inner carcass layer 104, the layer of corrosion resistant alloy 102, the inner sheath layer 106, a pressure armor layer 108, a plurality of tensile armor layers that may include first and second tensile armor layers 112, 116, a first anti-wear tape layer 110, a second anti-wear tape layer 114, and an outer sheath layer 118. In this example, the pressure armor layer 108, the anti-wear tape layers 110, 114 and the tensile armor layers 112, 116 make up an annular region 120. The annular region 120 may include openings, for example, in the armor layers 108, 112, 116 that may be infiltrated by production fluids, water, or both.

The inner carcass layer 104 may form the innermost layer of the flexible pipe 100 and may prevent the collapse of the flexible pipe 100 due to pipe decompression, external pressures, mechanical crushing loads, or the build-up of gases in the annular region 120. The inner carcass layer 104 is a helically wound interlocking metal in the inner profile of the flexible pipe 100 that is not impermeable to the flow of the production fluids since it is not gas-tight or fluid-tight. As a result, the inner carcass layer 104 may be in direct contact with the production fluids, thus, the material of the inner carcass layer 104 may be made of a corrosion resistant material. By example, the inner carcass layer 104 may be made of stainless steel, where different grades of stainless steel may be utilized based on the characteristics of the production fluids or the environment of the flexible pipe 100.

The flexible pipe 100 including the layer of corrosion resistant alloy 102 may be used in environments that may lead to corrosion or other degradation of the armor layer material in the annular region 120s. A solid layer of corrosion resistant alloy 102 may be disposed around the inner carcass layer 104. The layer of corrosion resistant alloy 102 can inhibit the diffusion of corrosive acid gases through the inner sheath layer 106 and into the annular region 120. Thus, incorporating the layer of corrosion resistant alloy 102 within the flexible pipe 100 can inhibit corrosion or other degradation of the armor layers 108, 112, 116 without hindering the flexibility of the flexible pipe 100.

The materials that make up the layer of corrosion resistant alloy 102 may be selected to withstand various types of environmental assisted corrosion, e.g., stress corrosion cracking, sulphide stress cracking, pitting corrosion, crevice corrosion, among others. In some embodiments, the layer of corrosion resistant alloy 102 may include steel and alloys of steel, such as a high-chromium (Cr) content steel (e.g., 10%-30% Cr) or a high-nickel (Ni) content steel (e.g., 10%-20% Ni), among others. In addition to a steel-based material, the layer of corrosion resistant alloy 102 may be any suitable metal alloy that may include a high resistance to uniform attack, localized corrosion resistance, and stress corrosion cracking resistance, among other material stressors. In some embodiments, the layer of corrosion resistant alloy 102 may include a Ni—Cr alloy containing iron (Fe), Molybdenum (Mo), Cobalt (Co), Tungsten (W), Carbon (C), Manganese (Mn), or a titanium alloy containing Molybdenum (Mo), Niobium (No), Aluminum (Al), Silicon (Si), among others. While the choice of the material selected for the layer of corrosion resistant alloy 102 may depend on the environment of the flexible pipe 100, other parameters, such as anticipated operating temperatures and pressures, as well as an expected service life, may also be used in selecting the type of material.

The inner sheath layer 106 may be disposed around the layer of corrosion resistant alloy 102. The inner sheath layer 106 generally acts as a barrier to contain the production fluids flowing through the inner carcass layer 104 in the flexible pipe 100. The inner sheath layer 106 may be a high-performance polymer material that is resistant to mechanical and thermal stresses. Some materials utilized in the inner sheath layer 106 may include polyamides, cross-linked polyethylenes (XLPE), high-density polyethylenes (HDPE), polyvinylidene fluorides (PVDF), and other polymers. Environmental conditions may determine the selection of the material for the inner sheath layer 106. For example, for low temperature fluids, HDPE and polyamide may be used, since these materials are suitable at about 65° C. (149° F.) and about 95° C. (203° F.), respectively. At higher temperatures, e.g., about 130° C. (266° F.), a more thermally stable material, such as PVDF, may be more suitable. As noted herein, without the layer of corrosion resistant alloy 102, a damaged or inoperable inner sheath layer 106 may allow for the permeation of acid gases, such as $CO_2$ and $H_2S$, from within the production fluids and into the annular region 120.

The pressure armor layer 108 may be disposed around the inner sheath layer 106. The pressure armor layer 108 may be an interlocking metal spiral that facilitates the bending and flexing motions of the flexible pipe 100. The material used for the interlocking metal spiral may include carbon steel with a yield strength in the range of about 700 megapascals (MPa) to about 1,400 MPa. In some embodiments, the pressure armor layer 108 may include C-shaped metallic wire layers, metallic strips of steel, or a combination of both. For example, the interlocking metal spirals of the pressure armor layer 108 may include various interlocking profiles, including Zeta Flex-Lok®, C-clip, or Theta shapes, among others.

The pressure armor layer 108 may generally assist the flexible pipe 100 in withstanding hoop stress due to internal pressure from the fluids transported by the flexible pipe 100 and may generally increase the axial and burst strengths of the flexible pipe 100. In some high-pressure applications, additional layers of non-interlocking flat steel profiles may cover the pressure armor layer 108 to provide added strength.

The tensile armor may include multiple cross-wound layers of material, for example at least two layers with one layer running in the clockwise direction and another layer in the anti-clockwise (counterclockwise) direction. As shown in FIG. 1, the annular region 120 may include the pair of tensile armor layers 112, 116, e.g., carbon steel wire layers or carbon fiber wire layers, that can be cross-wound in opposite directions and separated by the second anti-wear tape layer 114. The cross-wound configuration may provide strength and reinforcement against axial stresses caused by internal pressures and external loads upon the flexible pipe 100, as well as tensile loads from the pipe 100.

The tensile armor wires (carbon steel or carbon fiber) 112, 116 may be at a lay angle of between about 20° to about 55° to support the weight of the flexible pipe 100 as it is offloaded from a vessel and into a seabed, transferring the weight of the flexible pipe 100 to the vessel. The lay angle is the angle between an axis of the tensile armor wires 112, 116 and a line parallel to a longitudinal axis of the flexible pipe 100.

In some embodiments, the first anti-wear tape layer 110 may be disposed around the pressure armor layer 108 and the second anti-wear tape layer 114 may be located between the first tensile armor layer 112 and the second tensile armor layer 116. Additionally, anti-wear tape layers may be located between any two layers to reduce friction and wear between the layers during movements of the flexible pipe 100. The anti-wear tape layers 110, 114 may also aid the armor layers 108, 112, 116 in maintaining their wound shape. The anti-wear tape layers 110, 114 may be made of a thermoplastic material, e.g., high-density polyethylene (HDPE), polyamide 11, and polyvinylidene fluoride (PVDF), among other polymer materials, that is sufficiently durable to withstand contact stresses and slip amplitudes. Such thermoplastic materials provide a wide range of favorable properties, such as flexibility. Additionally, the anti-wear tape layers 110, 114 may be wear resistant so as to retain their minimum strength at production temperatures and pressures.

The flexible pipe 100 may include an outer sheath layer 118 disposed around the second tensile armor layer 116. The outer sheath layer 118 can provide a seal against fluids external to the flexible pipe 100, e.g., seawater and fresh water, in order to inhibit the infiltration of the external fluids into the annular region 120. Additionally, the flexible pipe 100 may be subjected to external forces that could affect the integrity of the armor layers 108, 112, 116 and of the pipe 100. Thus, the outer sheath layer 118 can provide mechanical protection against impact, erosion, and tearing, among other external factors. The outer sheath layer 118 may be composed of a durable polymeric material as detailed with respect to the inner sheath layer 106. As discussed herein, the inner sheath layer 106 and the outer sheath layer 118 may be made from the same or different materials. Further, each of the sheath layers 106, 118 may include material blends, alloys, compounds, or sub-layers of composite materials, among others.

Damage to the inner sheath layer 106 may lead to the intrusion of corrosive production fluids into the annular region 120. Exposure to such production fluids may lead to corrosion or other degradation of the pressure armor layer 108, the tensile armor layers 112, 116, or both. For example, $CO_2$ and $H_2S$ may diffuse through the inner sheath layer 106 into the annular region 120 to form a corrosive environment. Accordingly, a layer of corrosion resistant alloy 102 disposed at any location between the inner carcass layer 104 and the armor layers can inhibit the diffusion of the corrosive fluids through the inner sheath layer 106 and into the annular region 120. Thus, the layer of corrosion resistant alloy 102 inhibits the generation of a potentially corrosive or degrading environment in the annular region 120 while maintaining the flexibility of the flexible pipe 100.

The drawing of FIG. 1 is not intended to indicate that the flexible pipe 100 is to include all of the components shown in FIG. 1. Further, any number of additional components may be included within the flexible pipe 100, depending on the details of the specific implementation. For example, the flexible pipe 100 may include any suitable number of sheath layers, anti-wear tape layers, armor layers, or layers of corrosion resistant alloys in various configurations.

Figure 2:
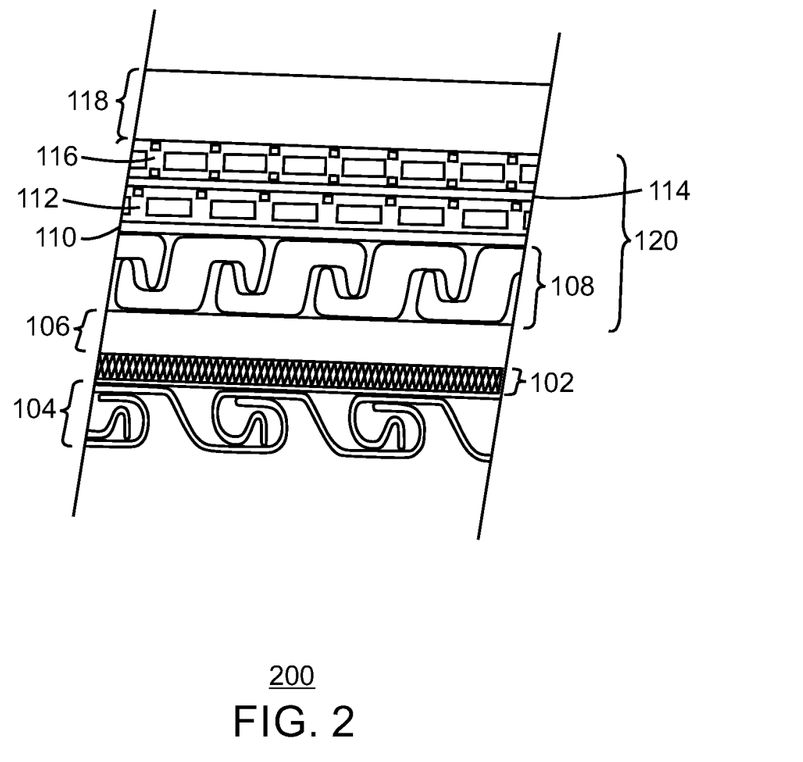
FIG. 2 is a cross-sectional view of a flexible pipe with a layer of corrosion resistant alloy disposed externally of an inner carcass layer and internally of an inner sheath layer, in accordance with one or more embodiments of the present disclosure.

FIG. 2 is a cross-sectional view of a flexible pipe 200 with a layer of corrosion resistant alloy 102 disposed externally of an inner carcass layer 104 and internally of an inner sheath layer 106, in accordance with one or more embodiments of the present disclosure. Like numbers are as described with respect to FIG. 1. As shown in FIG. 2, the flexible pipe 200 includes the inner carcass layer 104, the layer of corrosion resistant alloy 102, the inner sheath layer 106, a pressure armor layer 108, a first anti-wear tape layer 110, a first tensile armor layer 112, a second anti-wear tape layer 114, a second tensile armor layer 116, and an outer sheath layer 118. The pressure armor layer 108, the anti-wear tape layers 110, 114 and the tensile armor layers 112, 116 may collectively make up an annular region 120.

The inner carcass layer 104 may have an interlocking profile that is permeable to corrosive fluids within the production fluids. As previously discussed with respect to FIG. 1, the layer of corrosion resistant alloy 102 can inhibit the diffusion of such corrosive fluids into the annular region 120. Additionally, the uniform profile of the layer of corrosion resistant alloy 102 can assist in extruding a uniform inner sheath layer 106, as it is disposed directly adjacent the layer of corrosion resistant alloy 102. By comparison, without the layer of the corrosion resistant alloy 102, problems associated with migration and permeation of production fluids may arise. For example, the interlocking profile of the inner carcass layer 104 may allow the extruded material of the inner sheath layer 106 to flow into gaps in the profile of the inner carcass layer 104, potentially leading to thin spots, or even gaps, that allow production fluids to directly migrate into the annular region 120. However, a uniform layer of corrosion resistant alloy 102 may aid in extrusion control by providing a smooth surface upon which the inner sheath layer 106 can be disposed. In some embodiments, the layer of corrosion resistant alloy 102 may have a thickness ranging from 0.25 millimeter (mm) to 3.0 mm.

The pressure armor layer 108 may be disposed upon the inner sheath layer 106. The pressure armor layer 108 may be an interlocking metal spiral that facilitates the bending and flexing motions of the flexible pipe 200. The first tensile armor layer 112 and the second tensile armor layer 116 may be helically wound in opposite directions.

The first anti-wear tape layer 110 may be located between the pressure armor layer 108 and the first tensile armor layer 112. The second anti-wear tape 114 may be located between the first tensile armor layer 112 and the second tensile armor layer 116. Moreover, additional anti-wear tape layers may be provided in other areas of the flexible pipe 200 to reduce friction and wear between separate layers. The outer sheath layer 118 may be disposed around the second tensile armor layer 116. As previously discussed, the outer sheath layer 118 may be utilized to protect the flexible pipe 200 against the penetration of seawater and mechanical damage and to keep the second tensile armor layer 116 in position.

The drawing of FIG. 2 is not intended to indicate that the flexible pipe 200 is to include all of the components shown in FIG. 2. Further, any number of additional components may be included within the flexible pipe 200, depending on the details of the specific implementation. For example, the basic structure of the flexible pipe 200 may include any number of suitable configurations to enhance durability and functionality.

Figure 3:
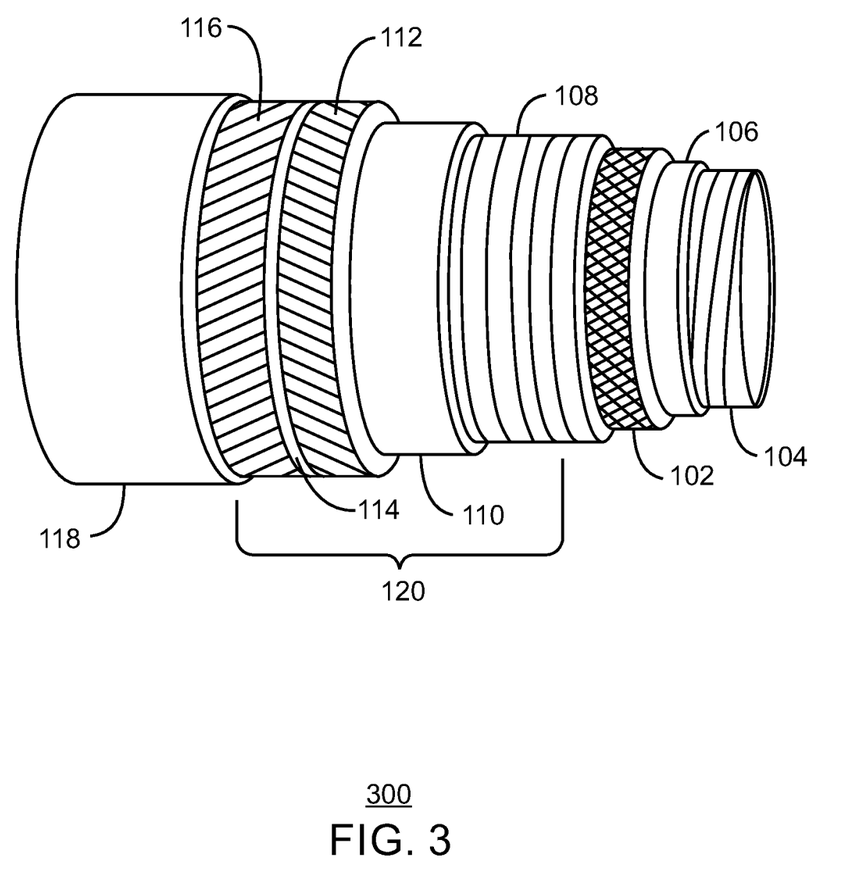
FIG. 3 is a cut-away drawing of a flexible pipe with a layer of corrosion resistant alloy disposed externally of an inner sheath layer and internally of at least one armor layer, in accordance with one or more embodiments of the present disclosure.

FIG. 3 is a cut-away drawing of a flexible pipe 300 with a layer of corrosion resistant alloy 102 disposed externally of an inner sheath layer 106 and internally of at least one armor layer, in accordance with one or more embodiments of the present disclosure. Like numbers are as described with respect to FIG. 1. During manufacturing, the inner sheath layer 106 may be disposed around an inner carcass layer 104. The layer of corrosion resistant alloy 102 may be disposed externally of the inner sheath layer 106 so as to be disposed between the inner sheath layer 106 and a pressure armor layer 108. The pressure armor layer 108 may be disposed around the layer of corrosion resistant alloy 102. Similar to FIG. 1, a first anti-wear tape layer 110 may be disposed between the pressure armor layer 108 and a first tensile armor layer 112. A second anti-wear tape layer 114 may be disposed between the first tensile armor layer 112 and a second tensile armor layer 116. The pressure armor layer 108, the anti-wear tape layers 110, 114 and the first and second tensile armor layers 112, 116 may make up an annular region 120. An outer sheath layer 118 may be disposed around the second tensile armor layer 116.

Due to possible damage to the inner sheath layer 106, corrosive production fluids may breach the inner sheath layer 106 and may flow into the annular region 120. The layer of corrosion resistant alloy 102 can inhibit or block the diffusion of the corrosive fluids from entering the annular region 120, potentially inhibiting degradation of the armor layers 108, 112, 116. Thus, the layer of corrosion resistant alloy 102 may facilitate the usage of flexible pipes in corrosive environments, e.g., to carry production fluids with greater than about 5% acid gas content, without hindering the flexibility of the flexible pipe 300.

The drawing of FIG. 3 is not intended to indicate that the flexible pipe 300 is to include all of the components shown in FIG. 3. Further, any number of additional components may be included within the flexible pipe 300, depending on the details of the specific implementation. For example, the flexible pipe 300 may include any suitable number of sheath layers, anti-wear tape layers, armor layers, or layers of corrosion resistant alloys in various configurations.

Figure 4:
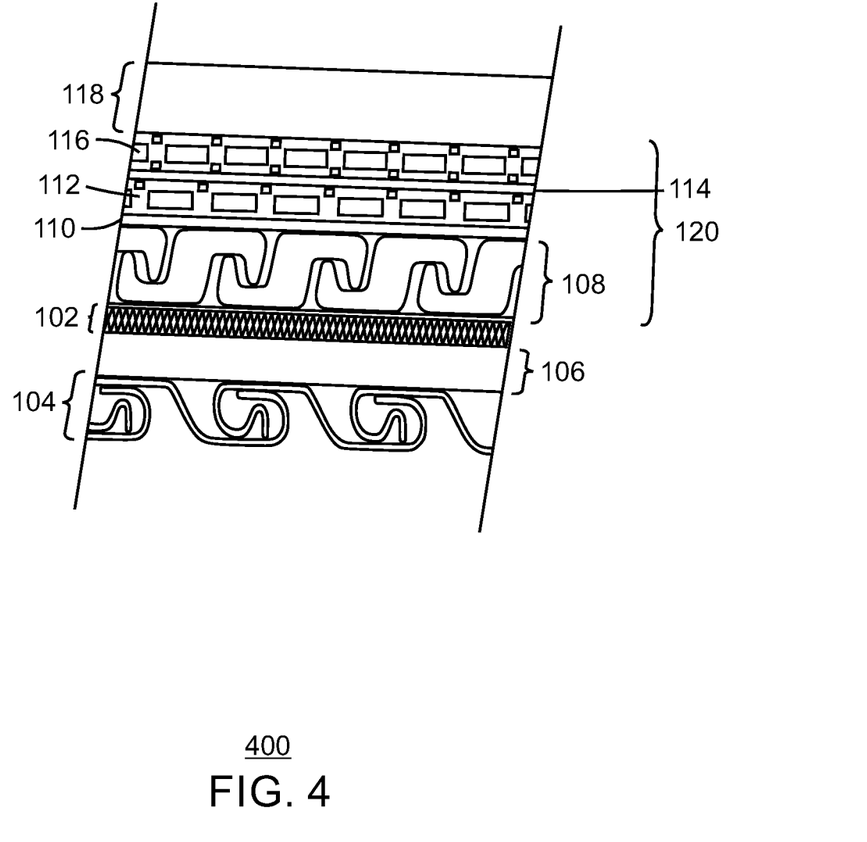
FIG. 4 is a cross-sectional view of a flexible pipe with a layer of corrosion resistant alloy disposed externally of an inner sheath layer and internally of at least one armor layer, in accordance with one or more embodiments of the present disclosure.

FIG. 4 is a cross-sectional view of a flexible pipe 400 with a layer of corrosion resistant alloy 102 disposed externally of an inner sheath layer 106 and internally of at least one armor layer, in accordance with one or more embodiments of the present disclosure. Like numbers are as described with respect to FIG. 1. As shown in FIG. 4, the flexible pipe 400 includes an inner carcass layer 104, the inner sheath layer 106, the layer of corrosion resistant alloy 102, a pressure armor layer 108, a first anti-wear tape layer 110, a first tensile armor layer 112, a second anti-wear tape layer 114, a second tensile armor layer 116, and an outer sheath layer 118. The pressure armor layer 108, the anti-wear tape layers 110 and 114 and the first and second tensile armor layers 112, 116 may collectively make up an annular region 120. As depicted in FIG. 4, the layer of corrosion resistant alloy 102 is disposed externally of the inner sheath layer 106 so as to be disposed between the inner sheath layer 106 and the pressure armor layer 108. Without hindering the flexibility of the flexible pipe 400, the layer of corrosion resistant alloy 102 can provide a non-permeable layer to inhibit the diffusion of corrosive materials through the inner sheath layer 106 into the annular region 120 of the flexible pipe 400.

The drawing of FIG. 4 is not intended to indicate that the flexible pipe 400 is to include all of the components shown in FIG. 4. Further, any number of additional components may be included within the flexible pipe 400, depending on the details of the specific implementation. For example, the basic structure of the flexible pipe 400 may include any suitable number of various configurations to enhance durability and functionality.

Figure 5:
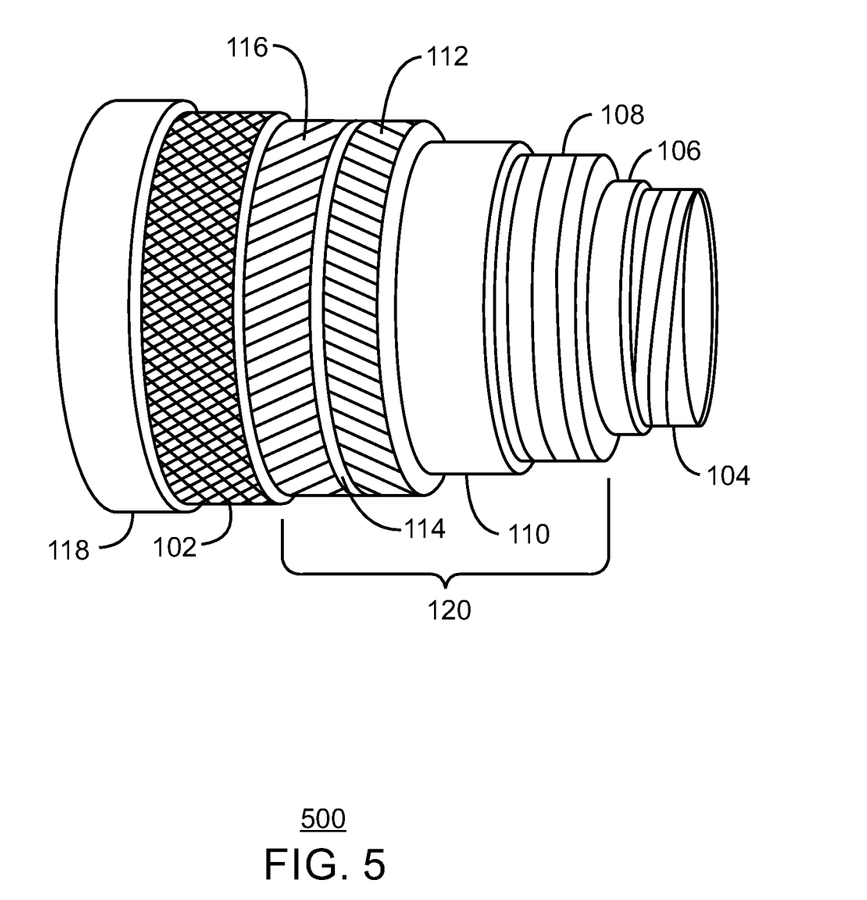
FIG. 5 is a cut-away drawing of a flexible pipe with a layer of corrosion resistant alloy disposed externally of a second tensile armor layer and internally of an outer sheath layer, in accordance with one or more embodiments of the present disclosure.

FIG. 5 is a cut-away drawing of a flexible pipe 500 with a layer of corrosion resistant alloy 102 disposed externally of a second tensile armor layer 116 and internally of an outer sheath layer 118, in accordance with one or more embodiments of the present disclosure. Like numbers are as described with respect to FIG. 1. As shown in FIG. 5, an annular region 120 may be made of a pressure armor layer 108, a first anti-wear tape layer 110, a first tensile armor layer 112, a second anti-wear tape layer 114, and a second tensile armor layer 116. While the outer sheath layer 118 may provide mechanical protection to the flexible pipe 500, there is a possibility that the outer sheath layer 118 may succumb to failures, including cracks, holes, and tears, among others. Such failures may lead to seawater and fresh water breaching the outer sheath layer 118 and entering the annular region 120. Water in the annular region may lead to the corrosion or other degradation of the armor layers 108, 112, 116. Further, the water may combine with $CO_2$ and $H_2S$ in the production fluids diffused through the inner sheath layer 106 to generate a corrosive environment. Accordingly, the layer of corrosion resistant alloy 102 disposed between the outer sheath layer 118 and the second tensile armor layer 116 can inhibit the infiltration of water into the annular region 120, thus, preserving the life expectancy of the flexible pipe 100 without hindering flexibility.

The drawing of FIG. 5 is not intended to indicate that the flexible pipe 500 is to include all of the components shown in FIG. 5. Further, any number of additional components may be included within the flexible pipe 500, depending on the details of the specific implementation. For example, the flexible pipe 500 may include any suitable number of sheath layers, anti-wear tape layers, armor layers, or layers of corrosion resistant alloys in various configurations.

Figure 6:
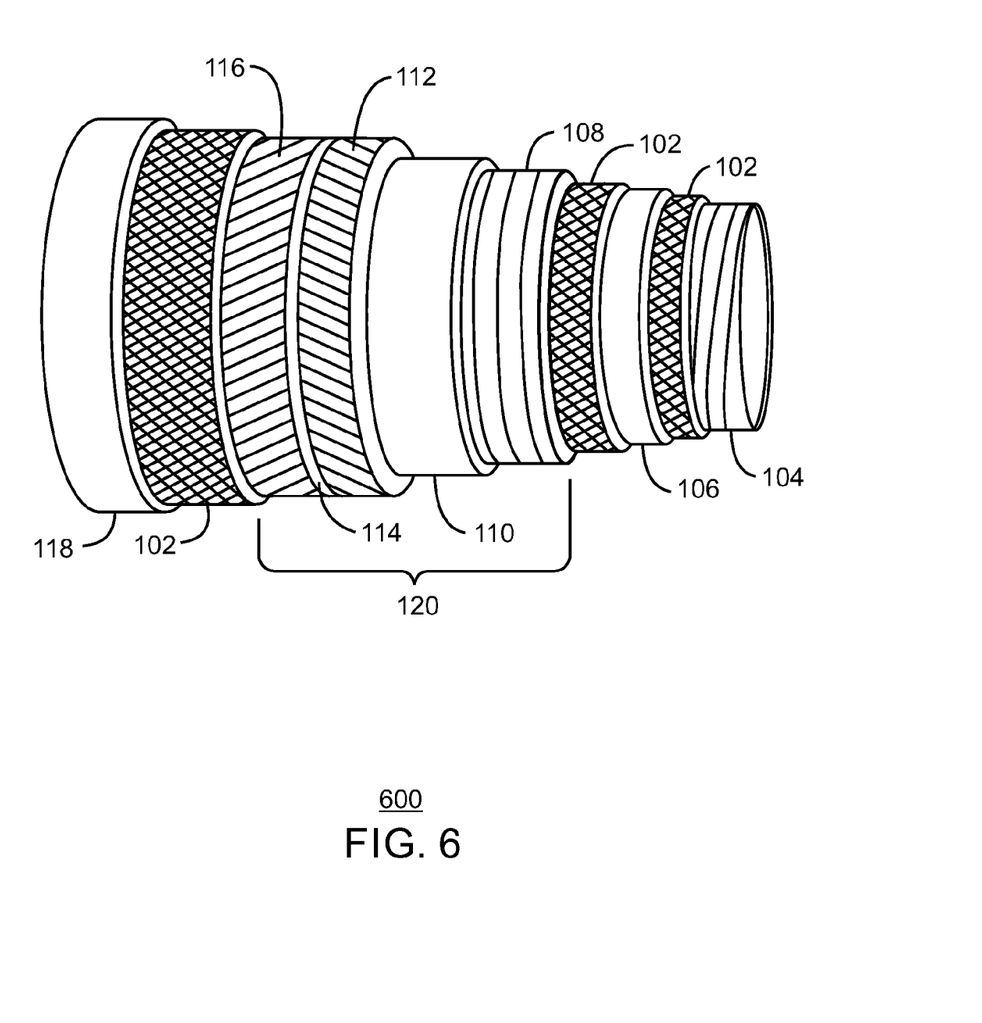
FIG. 6 is a cut-away drawing of a flexible pipe with several layers of corrosion resistant alloy disposed in various locations within the flexible pipe, in accordance with one or more embodiments of the present disclosure.

FIG. 6 is a cut-away drawing of a flexible pipe 600 with several layers of corrosion resistant alloy 102 disposed in various locations within the flexible pipe 600, in accordance with one or more embodiments of the present disclosure. Like numbers are as described with respect to FIG. 1. In one or more embodiments, several layers of the corrosion resistant alloy 102 may be located at various locations within the flexible pipe 600. As depicted in FIG. 6, a layer of corrosion resistant alloy 102 may be located between an inner carcass layer 104 and an inner sheath layer 106, a layer of corrosion resistant alloy 102 may be located between the inner sheath layer 106 and a pressure armor layer 108, and a layer of corrosion resistant alloy 102 may be located between the tensile armor layer 116 and an outer sheath layer 118. As shown in FIGS. 1-6, the layer of corrosion resistant alloy 102 may be disposed at one or more different positions within the flexible pipe 600. In some embodiments, the layer of corrosion resistant alloy 102 may be located at only one or two of the three different positions within the flexible pipe 600 in various configurations.

To maintain the flexible nature of the flexible pipe 600 and to inhibit stiffness, a layer of corrosion resistant alloy 102 may have a lesser thickness (as measured in cross-section) as the location moves radially outward towards the outer sheath layer 118. For example, a layer of corrosion resistant alloy 102 proximate the inner sheath layer 106 may have a greater thickness (as measured in cross-section) than a layer of corrosion resistant alloy 102 proximate the outer sheath layer 118. In some embodiments, the thickness of the layer of corrosion resistant alloy may range from about 0.25 mm to about 3.0 mm.

The drawing of FIG. 6 is not intended to indicate that the flexible pipe 600 is to include all of the components shown in FIG. 6. Further, any number of additional components may be included within the flexible pipe 600, depending on the details of the specific implementation. For example, the flexible pipe 600 may include any suitable number of sheath layers, anti-wear tape layers, armor layers, or layers of corrosion resistant alloys in various configurations.

Figure 7:
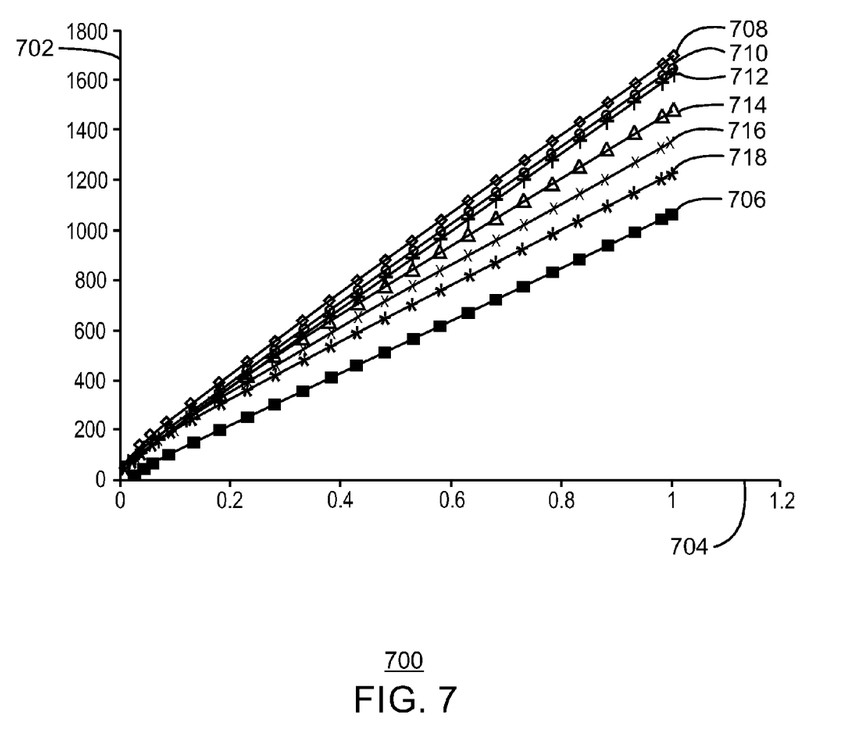
FIG. 7 is a plot of bending stiffness of a flexible pipe with and without the inclusion of a layer of corrosion resistant alloy.

FIG. 7 is a plot 700 of bending stiffness of a flexible pipe with and without the inclusion of a layer of corrosion resistant alloy. Bending stiffness is one of several inherent properties of a flexible pipe. For example, the flexible pipe may bend to a maximum pipe curvature radius, e.g., 1 radians. In particular, the flexible pipe may be bent over an offshore production vessel to aid in its installation into an uneven seabed while transferring its vertical load into the soil of the subsea. Including a layer of corrosion resistant alloy may be viewed as inhibiting the bending stiffness property of the flexible pipe; however, as shown in FIG. 7, the addition of the layer of corrosion resistant alloy within the flexible pipe may increase the bending moment 702 by about 20% to about 80%.

In the plot 700, the y-axis 702 represents bending moment in kilo-newton meter (KN-m) units, while the x-axis 704 represents the curvature of the pipe in radians units. Bending moment 702 is a measure of the flexibility/bending stiffness of the flexible pipe when an external force is applied to cause the flexible pipe to bend. Pipe curvature 704 is defined as a change in slope for the flexible pipe for a unit change in its path length. Thus, the bending moment 702 of the flexible pipe may be directly proportional to the pipe curvature 704.

To generate the plot 700, a finite element analysis (FEA) study was conducted to provide an estimate on the effect of the bending stiffness when a layer of corrosion resistant alloy was added between an inner sheath layer and an outer sheath layer. In various embodiments, the inner sheath layer and the outer sheath layer may be the two leading contributors to the bending stiffness of the flexible pipe. As discussed herein, the FEA study included two FEA models that were constructed to include a model of the flexible pipe without the layer of corrosion resistant alloy and a model of the flexible pipe with the layer of corrosion resistant alloy located internally of the inner sheath layer. The thickness of the corrosion resistant alloy layer for the various FEA models included a range of about 0.5 mm to about 1.0 mm. Additionally, the thickness of the inner sheath layer included a range between about 3.0 mm to about 10.0 mm and the thickness of the outer sheath layer included a value of about 15.0 mm. The plot 700, in conjunction with Table I, as shown below, may provide evidence of the impact that the layer of corrosion resistant alloy may have on the bending moment and curvature of the flexible pipe.

TABLE I

Legend for Characters on Plot 700.

| Reference Number | Thickness of Corrosion Resistant Alloy Layer (CRA) | Thickness of Inner Sheath (IS) |
| --- | --- | --- |
| 706 | NO CRA | 10 mm IS |
| 708 | 1 mm CRA | 10 mm IS |
| 710 | 0.7 mm CRA | 10 mm IS |
| 712 | 0.5 mm CRA | 10 mm IS |
| 714 | 1 mm CRA | 7 mm IS |
| 716 | 1 mm CRA | 5 mm IS |
| 718 | 1 mm CRA | 3 mm IS |

As interpreted, the plot 700 and Table I shows that the flexible pipe can maintain its flexibility and configuration despite the inclusion of the layer of corrosion resistant alloy, which may hinder or eliminate corrosion or other degradation of armor layers within the flexible pipe, thus, possibly leading to a longer service life for the flexible pipe.

Figure 8:
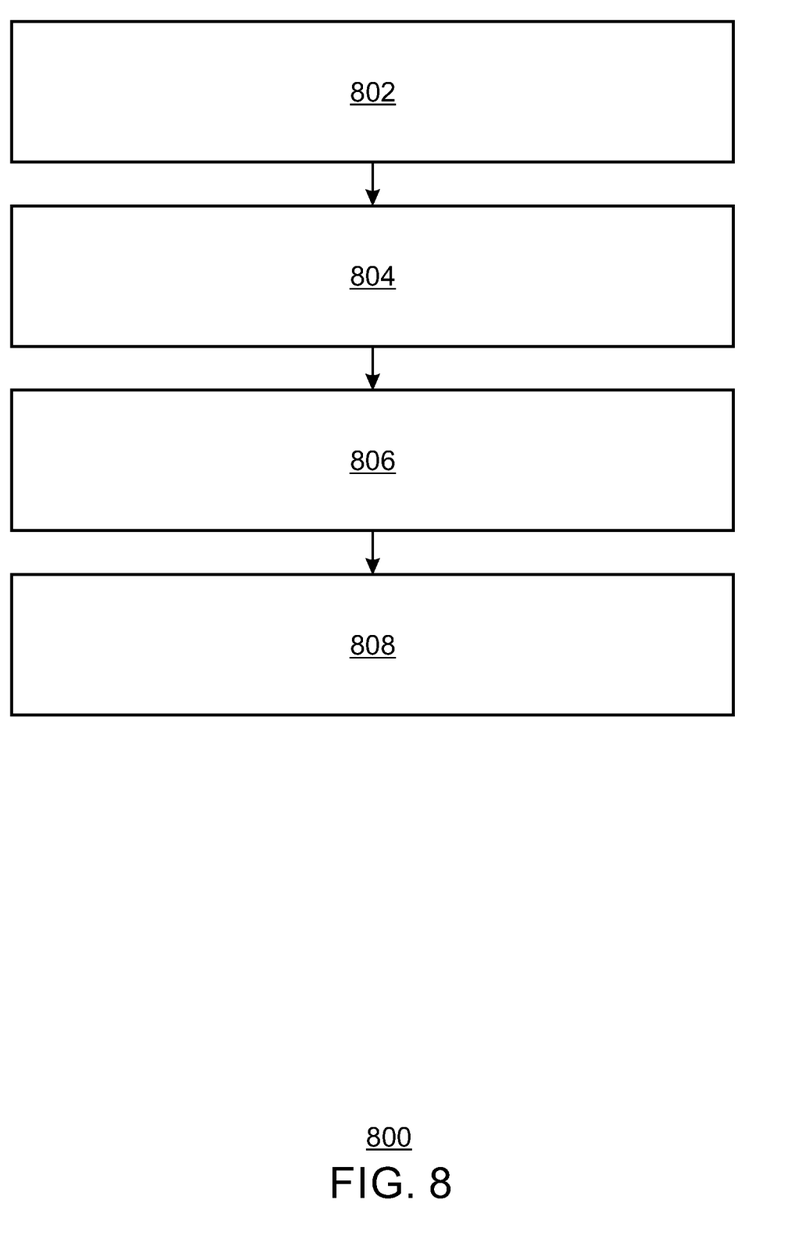
FIG. 8 is a process flow diagram of a method of making a flexible pipe, in accordance with one or more embodiments of the present disclosure.

FIG. 8 is a process flow diagram of a method 800 of making a flexible pipe, in accordance with one or more embodiments of the present disclosure. At block 802, a metal sheet or tape, e.g., of stainless steel, is provided. The metal sheet or tape may be wound to form an inner carcass layer as an innermost interlocking layer of the flexible pipe. In operation, a sheet of steel may undergo deforming and winding operations to form the interlocking profile. For example, the inner carcass layer may be deformed and wound at specific angles so as to produce sufficient flexibility within the flexible pipe.

At block 804, an inner sheath layer and an outer sheath layer may be positioned externally of the inner carcass layer. The inner sheath layer and the outer sheath layer may be extruded using an extrusion process. At block 806, a layer of corrosion resistant alloy is positioned at any location between the inner carcass layer and the outer sheath layer. At block 808, at least one armor layer is positioned internally of the outer sheath layer. The at least one armor layer may be wound internally of the outer sheath layer.

The order of the components positioned to form a flexible pipe may vary, depending on the details of the specific implementation. FIGS. 1-6 illustrate several different configurations of the flexible pipe. The configurations of FIGS. 1-6 also include positioning a plurality of anti-wear tape layers (e.g., a first anti-wear tape layer 110, a second anti-wear tape layer 114). As an example with respect to FIG. 1, an inner carcass layer 104 is provided. A layer of corrosion resistant alloy 102 is positioned directly adjacent the inner carcass layer 104. An inner sheath layer 106 is positioned directly adjacent the layer of corrosion resistant alloy 102. A pressure armor layer 108 is positioned directly adjacent the inner sheath layer 106. A first anti-wear tape layer 110 is positioned directly adjacent the pressure armor layer 108. A first tensile armor layer 112 is positioned directly adjacent the first anti-wear tape layer 110. A second anti-wear tape layer 114 is positioned directly adjacent the first tensile armor layer 112. A second tensile armor layer 116 is positioned directly adjacent the second anti-wear tape layer 114. An outer sheath layer 118 is positioned directly adjacent the second tensile armor layer 116.

With respect to the layer of corrosion resistant alloy, a single layer of corrosion resistant alloy may be positioned within the flexible pipe or a plurality of layers of corrosion resistant alloy may be positioned within the flexible pipe (e.g., two, three, or more layers). A layer of corrosion resistant alloy may be positioned internally of the inner sheath layer and externally of the inner carcass layer. Additionally, or in the alternative, a layer of corrosion resistant alloy may be positioned externally of the inner sheath layer and internally of the at least one armor layer. These configurations can inhibit the infiltration of corrosive production fluids that may diffuse through the inner carcass layer and otherwise breach the annular region. Thus, a layer of corrosion resistant alloy disposed internally of the at least one armor layer and externally of the inner carcass layer can inhibit the flow of the corrosive fluids into the annular region to protect the armor layers from possible corrosion or other degradation. Additionally, or in the alternative, a layer of corrosion resistant alloy may be positioned internally of the outer sheath layer and externally of the at least one armor layer. This configuration can inhibit the infiltration of external fluids (e.g., seawater or fresh water) into the annular region, thus, preserving the life expectancy of the flexible pipe.

Several processes may be utilized to position the layer of corrosion resistant alloy. For example, an extrusion process, e.g., cold or hot, may be implemented to dispose the layer of corrosion resistant alloy. Additionally, a welding technique may be implemented to secure the layer of corrosion resistant alloy. In some cases, the layer of corrosion resistant alloy may be in the form of pre-fabricated sheets that can be wrapped. The seams of the sheets may then be attached using a welding technique, e.g., longitudinal seam welding and optionally girth welding.

In some embodiments, the layer of corrosion resistant alloy may form a pressure-tight sealing inside of an end-fitting of the flexible pipe. The corrosion resistant alloy may be sealed in such a manner by girth welding or by crimping. Specifically, girth welding includes circumferential welding where abutting ends of the layer of corrosion resistant alloy may be welded together. The process of crimping includes attaching a metal fitting to a pre-fabricated sheet of the layer of the corrosion resistant alloy so as to mechanically lock the metal fitting and the sheet together by mechanical means, e.g., crimp die.

The method of FIG. 8 may include more or less method steps in fabricating the flexible pipe other than those shown in FIG. 8. Further, any number of additional components may be included within the flexible pipe 800, depending on the details of the specific implementation.

While the present techniques may be susceptible to various modifications and alternative forms, the exemplary embodiments discussed above have been shown only by way of example. However, it should again be understood that the techniques are not intended to be limited to the particular embodiments disclosed herein. Indeed, the present techniques include all alternatives, modifications, and equivalents falling within the true spirit and scope of the appended claims.

What is claimed is:

1. A flexible pipe, comprising
an inner carcass layer;
an inner sheath layer and an outer sheath layer each disposed externally of the inner carcass layer and each comprising a polymer material;
a layer of corrosion resistant alloy, wherein the corrosion resistant alloy layer is disposed at any location between the inner carcass layer and the outer sheath layer, and further wherein the corrosion resistant alloy layer is solid and provides a non-permeable layer such that diffusion of corrosive fluids, water, or both are inhibited; and
at least one armor layer disposed internally of the outer sheath layer.

2. The flexible pipe of claim 1, wherein the layer of corrosion resistant alloy is disposed internally of the inner sheath layer.

3. The flexible pipe of claim 1, wherein the layer of corrosion resistant alloy is disposed externally of the inner sheath layer and internally of the at least one armor layer.

4. The flexible pipe of claim 1, wherein the layer of corrosion resistant alloy is disposed externally of the at least one armor layer and internally of the outer sheath layer.

5. The flexible pipe of claim 1, wherein the layer of corrosion resistant alloy is disposed directly adjacent to the inner sheath layer.

6. The flexible pipe of claim 1, wherein a plurality of layers of corrosion resistant alloy are disposed at any location between the inner carcass layer and the outer sheath layer.

7. The flexible pipe of claim 6, wherein the plurality of layers of corrosion resistant alloy includes one layer of corrosion resistant alloy disposed directly adjacent the outer sheath layer and another layer of corrosion resistant alloy disposed directly adjacent the inner sheath layer.

8. The flexible pipe of claim 7, wherein the layer of corrosion resistant alloy adjacent the outer sheath layer has a thickness less than the layer of corrosion resistant alloy adjacent the inner sheath layer.

9. The flexible pipe of claim 1, wherein the polymer material of the inner sheath layer is different from the polymer material of the outer sheath layer.

10. The flexible pipe of claim 1, wherein the layer of corrosion resistant alloy comprises a steel, a chromium (Cr) content steel alloy with a Cr content of about 10% to about 30%, or a nickel (Ni) content steel alloy with a Ni content of about 10% to about 20%.

11. The flexible pipe of claim 1, wherein the at least one armor layer comprises at least one pressure armor layer and at least one tensile armor layer.

12. The flexible pipe of claim 1, wherein the thickness of the layer of corrosion resistant alloy ranges from about 0.25 mm to about 3.0 mm.

13. The flexible pipe of claim 1, wherein the at least one armor layer comprises a metal armor wire layer.

14. A flexible pipe for use during subsea production, comprising
an inner carcass layer, wherein production fluids flow interior of the inner carcass layer;
an inner sheath layer and an outer sheath layer each disposed externally of the inner carcass layer and each comprising a polymer material;
a layer of corrosion resistant alloy disposed at any location between the inner carcass layer and the outer sheath layer, wherein the corrosion resistant alloy layer is solid and provides a non-permeable layer such that diffusion of corrosive fluids, water, or both are inhibited; and
at least one armor layer disposed internally of the outer sheath layer.

* * * * *